United States Patent
Bhaskaran (10) Patent No.: US 12,538,110 B2
(45) Date of Patent: Jan. 27, 2026

(54) EVENT-BASED COMMANDS

(71) Applicant: Hewlett-Packard Development Company, L.P., Spring, TX (US)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 332 days.

(21) Appl. No.: 18/042,978

(22) PCT Filed: Oct. 23, 2020

(86) PCT No.: PCT/US2020/057228
§ 371 (c)(1),
(2) Date: Feb. 24, 2023

(87) PCT Pub. No.: WO2022/086566
PCT Pub. Date: Apr. 28, 2022

(65) Prior Publication Data
US 2024/0031787 A1    Jan. 25, 2024

(51) Int. Cl.
*H04W 4/80*   (2018.01)
*H04W 76/10*  (2018.01)

(52) U.S. Cl.
CPC ............ *H04W 4/80* (2018.02); *H04W 76/10* (2018.02)

(58) Field of Classification Search
CPC ............................ H04W 4/80; H04W 76/10
See application file for complete search history.

(56) References Cited

U.S. PATENT DOCUMENTS

| | | |
|---|---|---|
| 8,359,014 B2 | 1/2013 | Olincy et al. |
| 8,483,774 B2 | 7/2013 | Biddy, Jr. et al. |
| 9,008,633 B2 | 4/2015 | Varoglu et al. |
| 2008/0137643 A1 | 6/2008 | Khanchandani et al. |
| 2015/0358778 A1 | 12/2015 | Heo et al. |
| 2018/0332160 A1 | 11/2018 | Brogan et al. |
| 2019/0065732 A1 | 2/2019 | Woo et al. |

FOREIGN PATENT DOCUMENTS

| | | |
|---|---|---|
| EP | 2230605 A1 | 9/2010 |
| EP | 2509334 A1 | 10/2012 |
| WO | 2018/174663 A1 | 9/2018 |

*Primary Examiner* — Tuan H Nguyen
(74) *Attorney, Agent, or Firm* — Quarles & Brady LLP (57) ABSTRACT

A first electronic device may include a memory to store a command that is mapped to an event. Further, the first electronic device may include a transceiver to pair a second electronic device with the first electronic device via a short-range wireless connection. Furthermore, the first electronic device may include a processor to receive data from the second electronic device via the transceiver. The data may indicate an occurrence of the event on the second electronic device. In response to receiving the data, the processor may retrieve the command that is mapped to the event from the memory and execute the command to control an operation of the first electronic device.

18 Claims, 5 Drawing Sheets

| USER ACTION 272 | COMMAND 274 |
|---|---|
| RECEIVE/INITIATE CALL | CHANGE MESSENGER APPLICATION STATUS TO "BUSY" |
| END CALL | CHANGE MESSENGER APPLICATION STATUS TO "AVAILABLE" |
| OPEN/INTERACT WITH APPLICATION | PAUSE MULTIMEDIA PLAYER APPLICATION |
| CLOSE APPLICATION | PLAY MULTIMEDIA PLAYER APPLICATION |

| PROFILE 352 | EVENT 354 | RULE 356 | OPERATION 358 |
|---|---|---|---|
| USER PROFILE 1 | SECOND ELECTRONIC DEVICE IS IN USE | ACTIVATE RULE 1 | LOCK FIRST ELECTRONIC DEVICE |
| | | | ENABLE POWER SAVING MODE |
| | | | CHANGE MESSENGER APPLICATION STATUS TO "BUSY" |
| | SECOND ELECTRONIC DEVICE IS NOT IN USE | DEACTIVATE RULE 1 | UNLOCK FIRST ELECTRONIC DEVICE |
| | | | DISABLE POWER SAVING MODE |
| | | | RESET MESSENGER APPLICATION STATUS TO "AVAILABLE" |
| USER PROFILE 2 | RECEIVE/INITIATE CALL | ACTIVATE RULE 2 | PAUSE/MUTE MULTIMEDIA CONTENT |
| | | | CHANGE MESSENGER APPLICATION STATUS TO "BUSY" |
| | END CALL | DEACTIVATE RULE 2 | PLAY/UNMUTE MULTIMEDIA CONTENT |
| | | | RESET MESSENGER APPLICATION STATUS TO "AVAILABLE" |
| USER PROFILE 3 | SECOND ELECTRONIC DEVICE IS IN USE | ACTIVATE RULE 3 | TURN OFF DISPLAY SCREEN |
| | SECOND ELECTRONIC DEVICE IS NOT IN USE | DEACTIVATE RULE 3 | TURN ON DISPLAY SCREEN |

EVENT-BASED COMMANDS

BACKGROUND

An electronic device such as a laptop computer, a personal computer, a tablet, or the like can be paired or associated with another electronic device such as a smartphone, a gaming console, a media player, or the like. For example, pairing may enable a first electronic device to communicate with a second electronic device over a wireless communication link. Example wireless communication link may be a short-distance wireless connection such as Bluetooth® that allows the first electronic device to communicate with the second electronic device.

BRIEF DESCRIPTION OF THE DRAWINGS

Examples are described in the following detailed description and in reference to the drawings, in which.

DETAILED DESCRIPTION

Users may perform multi-tasking using various electronic devices. For example, a user may use a first electronic device (e.g., a laptop) to perform office-related work while using a second electronic device (e.g., a mobile phone) to initiate a phone call, a chat, or the like. Various scenarios may exist where a user activity on one electronic device may call for an action on the other electronic device.

In an example scenario, while the user is working on the laptop, an "interrupt/event" that occurs in the mobile phone may lead the user to perform an action in the laptop. For example, when the user initiates/receives a phone call on the mobile phone, the user may intend to change a messenger status in the laptop to "Busy". In this example, not changing the messenger status may lead to a bad user experience, particularly, when a person pings the user on the messenger at a time when user is talking on the mobile phone and expects a response from the user since the messenger status is not changed.

In another example, a user may interact with an application (e.g., a social networking application, a gaming application, or the like) on the mobile phone, while the laptop is in a normal operational mode, in which various components, such as a processor, a graphics card, a hard drive, a display, and the like, may consume power. In this example, providing power to the components when the laptop is not being used may drain a battery of the laptop. In yet another example scenario, the laptop may include a display that outputs confidential/personal information. In this example, leaving the display turned-on when the laptop is not being used by the user may lead to privacy related issues. Thus, various scenarios may exist where the users may have to perform an action in the first electronic device while the second electronic device is being used, however, the effort and time may prevent the user from doing the same.

Examples described herein may control a first electronic device (e.g., a laptop) based on an event/activity/user action performed on a second electronic device (e.g., a mobile phone). The first electronic device may establish a short-range wireless connection with the second electronic device. Further, the first electronic device may receive data from the second electronic device via the short-range wireless connection. The data may indicate a user action performed on the second electronic device. Furthermore, the first electronic device may retrieve a command that is mapped to the user action from a memory. Also, the first electronic device may execute the command to control the first electronic device or an application running on the first electronic device.

In an example, the event can be mapped to a single action or a set of actions to be performed on the first electronic device and/or an application running in the first electronic device. Thus, examples described herein may provide a seamless user experience by controlling a behavior of the first electronic device and associated applications when the second electronic device is being used (i.e., an occurrence of a user action/event on the second electronic device).

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Figure 1A:
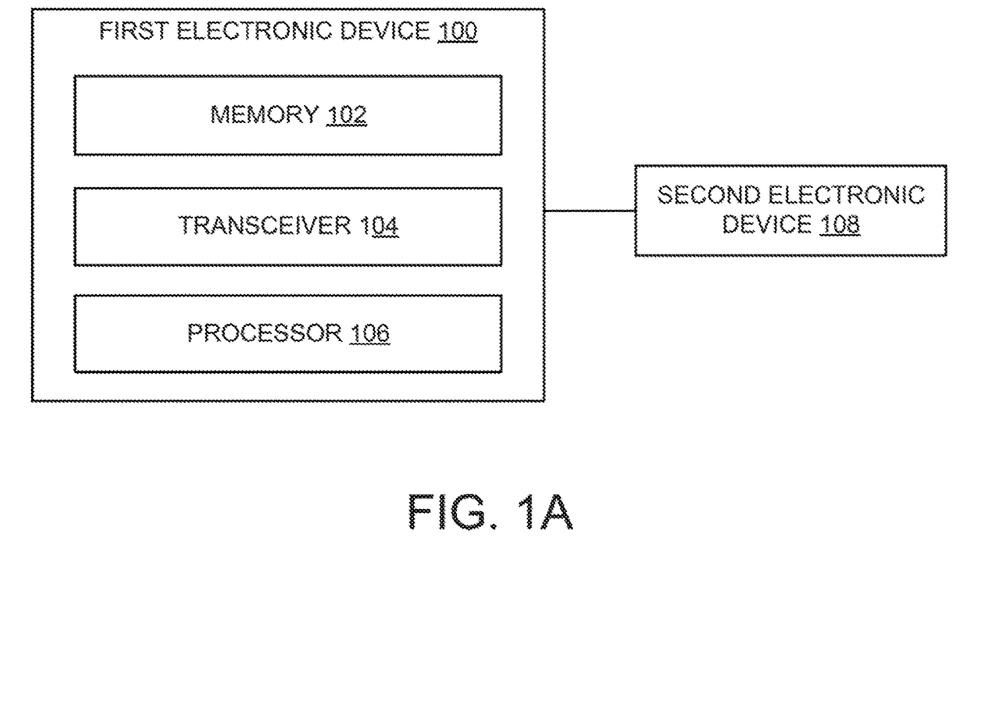
FIG. 1A is a block diagram of an example first electronic device, including a processor to control an operation of the first electronic device.

Turning now to the figures, FIG. 1A is a block diagram of an example first electronic device 100, including a processor 106 to control an operation of first electronic device 100. Example first electronic device 100 may include a desktop computer, a portable personal computer, an all-in-one personal computer, a tablet computer, a notebook computer, or the like.

First electronic device 100 may include a memory 102 to store a command that is mapped to an event. In the example shown in FIG. 1A, memory 102 is shown as a part of first electronic device 100, however, memory 102 can also reside in an external storage device, such as a hard disk, a storage card, or a data storage medium and can be accessible by first electronic device 100.

Further, first electronic device 100 may include a transceiver 104 to pair a second electronic device 108 with first electronic device 100 via a short-range wireless connection. Example second electronic device 108 may be a mobile phone, a tablet, a multimedia player, a personal data assistant (PDA), a printer, or the like. For example, transceiver 104 may be a device that is able to transmit and/or receive data through the short-range wireless connection. Example short-range wireless connection may include a Bluetooth® connection, a Near Field Communication (NFC) connection, a Radio Frequency Identification (RFID) connection, an Infrared Data Association (IrDA) connection, an Ultra-Wideband (UWB) connection, or a Zigbee® connection.

Furthermore, first electronic device 100 may include processor 106 communicatively connected to memory 102 and transceiver 104. During operation, processor 106 may receive data from second electronic device 108 via transceiver 104. The data may indicate an occurrence of the event on second electronic device 108. In an example, the event may indicate that second electronic device 108 is being in use. Example event may be occurred in response to a user interaction with second electronic device 108. For example, second electronic device 108 may include a display or a control panel that may present an interface to allow a user to interact with second electronic device 108. Example user interaction may include receiving a call on second electronic device 108, disconnecting the call on second electronic device 108, unlocking second electronic device 108, opening/interacting with an application on second electronic device 108, or the like.

In some examples, the data from second electronic device 108 to first electronic device 100 can be customized, for instance, by proprietary communication information. In this example, the customized data can be conducted from second electronic device 108 to first electronic device 100 given that second electronic device 108 and first electronic device 100 are paired, and a communication format is defined.

In response to receiving the data, processor 106 may retrieve the command that is mapped to the event from memory 102. In one example, the command may uniquely correspond to a respective event occurred on second electronic device 108. Further, processor 106 may execute the command to control an operation of first electronic device 100.

In an example, the command can be a first command associated with receiving a call, a second command associated with ending the call, a third command associated with unlocking second electronic device 108, or the like. In other words, processor 106 may retrieve the first command when the call is received on second electronic device 108, the second command when the call is terminated on second electronic device 108, or the like.

In one example, processor 106 may execute the command to switch an operational state of first electronic device 100 from a first operational state to a second operational state that consumes less power than the first operational state. For example, the second operational state may cause a display screen of first electronic device 100 to be turned off to reduce power consumption of first electronic device 100. In other examples, the second operational state may be a sleep mode, a hibernate node, or the like.

In another example, processor 106 may execute the command to lock first electronic device 100 to prevent an unauthorized access. For example, locking first electronic device 100 may include locking an operating system of first electronic device 100, which requires a password to unlock first electronic device 100. Example mapping between events and corresponding commands may be explained in FIG. 1B.

Figure 1B:
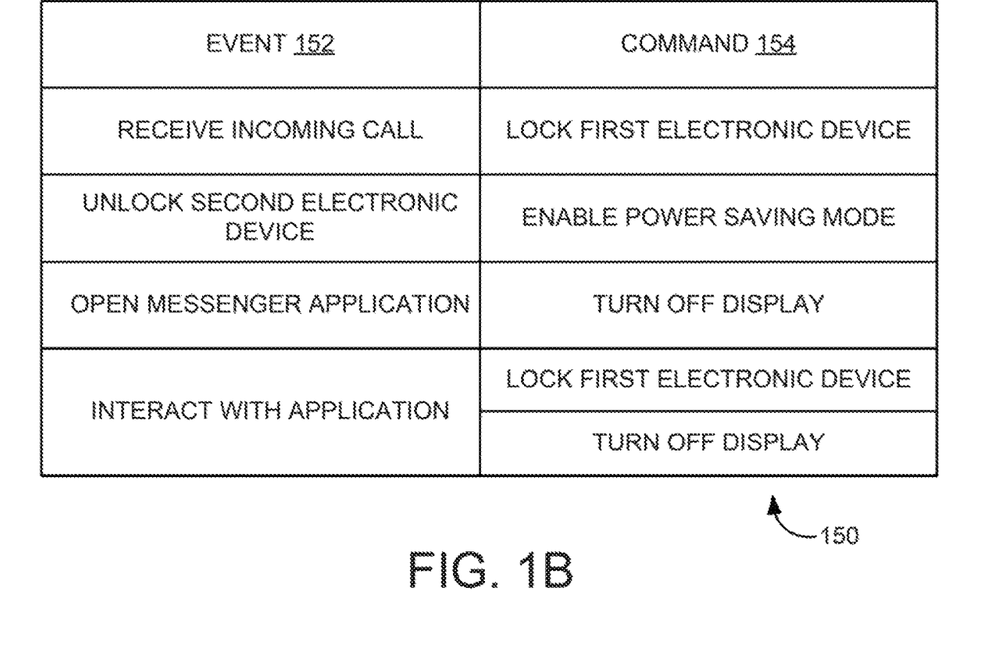
FIG. 1B illustrates an example table, depicting mapping between events and commands.

FIG. 1B illustrates an example table 150, depicting mapping between events and commands. In one example, the mapping between events and commands may be user configurable. As shown in FIG. 1B, table 150 may include a list of events in an event column 152 and a list of associated commands in a command column 154. Table 150 may match the commands in command column 154 to associated events in event column 152. Processor 106 (e.g., as shown in FIG. 1A) may access table 150 to retrieve a command associated with a particular event as indicated by the received data. Although FIG. 1B may be described using table 150, any suitable database format operable to be accessed and map associated commands and events may be used.

In the example table 150, a command "lock first electronic device 100" may be mapped to an event "receive incoming call". In this example, when a user receives an incoming call on second electronic device 108, then the command mapped to the event can be executed to lock first electronic device 100 to prevent an unauthorised access.

In another example, a command "enable power saving mode" may be mapped to an event "unlock second electronic device 108". In this example, a power saving mode may be enabled on first electronic device 100 when the user unlocks second electronic device 108 (e.g., a screen of second electronic device 108 is turned on). Similarly, the power saving mode may be disabled on first electronic device 100 when the user locks second electronic device 108. In this example, transceiver 104 may receive data indicating a user action from second electronic device 108 while first electronic device 100 is in a normal operating mode or a power saving mode.

In another example, when a messenger application is opened in second electronic device 108, a display screen of first electronic device 100 may be turned off to reduce power consumption of first electronic device 100. In other examples, a single event can also be mapped to various commands. For example, as shown in table 150, an event "interact with application" is mapped to commands "lock first electronic device 100" and "turn off display". In this example, when a user interacts with an application (e.g., a gaming application) in second electronic device 108, first electronic device 100 may be locked and the display screen may be turned off. Thus, various such operations/commands can be performed on first electronic device 100 based on a type of event/activity/user action performed on second electronic device 108.

In one example, the components of first electronic device 100 may be implemented in hardware, machine-readable instructions, or a combination thereof. Processor 106 may be implemented as microprocessors, microcomputers, microcontrollers, digital signal processors, central processing units, state machines, logic circuitries, or any devices that manipulate signals based on operational instructions. In some examples, processor 106 may be configured to fetch and execute machine-readable instructions stored in memory 102. Example instructions may include routines, programs, components, applications, data structures, and the like, which perform particular tasks or implement particular abstract data types. The instructions, being executable by processor 106, may also be referred to as processor-executable instructions.

The functions of the various elements shown in FIG. 1A, including any functional blocks labeled as "processor(s)", may be provided using dedicated hardware as well as hardware capable of executing programs. When provided by a processor, the functions may be provided by a single dedicated processor, by a single shared processor, or by a plurality of individual processors, some of which may be shared. Further, explicit use of the term "processor" may not be construed to refer exclusively to hardware capable of executing programs, and may implicitly include, without limitation, digital signal processor (DSP) hardware, network processor, application specific integrated circuit (ASIC), field programmable gate array (FPGA), or the like. In some examples, other custom-built hardware may also be included. Memory 102 may include the machine-readable medium, for example, volatile memory (e.g., random access memory (RAM)), and/or non-volatile memory (e.g., erasable programmable read-only memory (EPROM), flash memory, or the like).

Figure 2A:
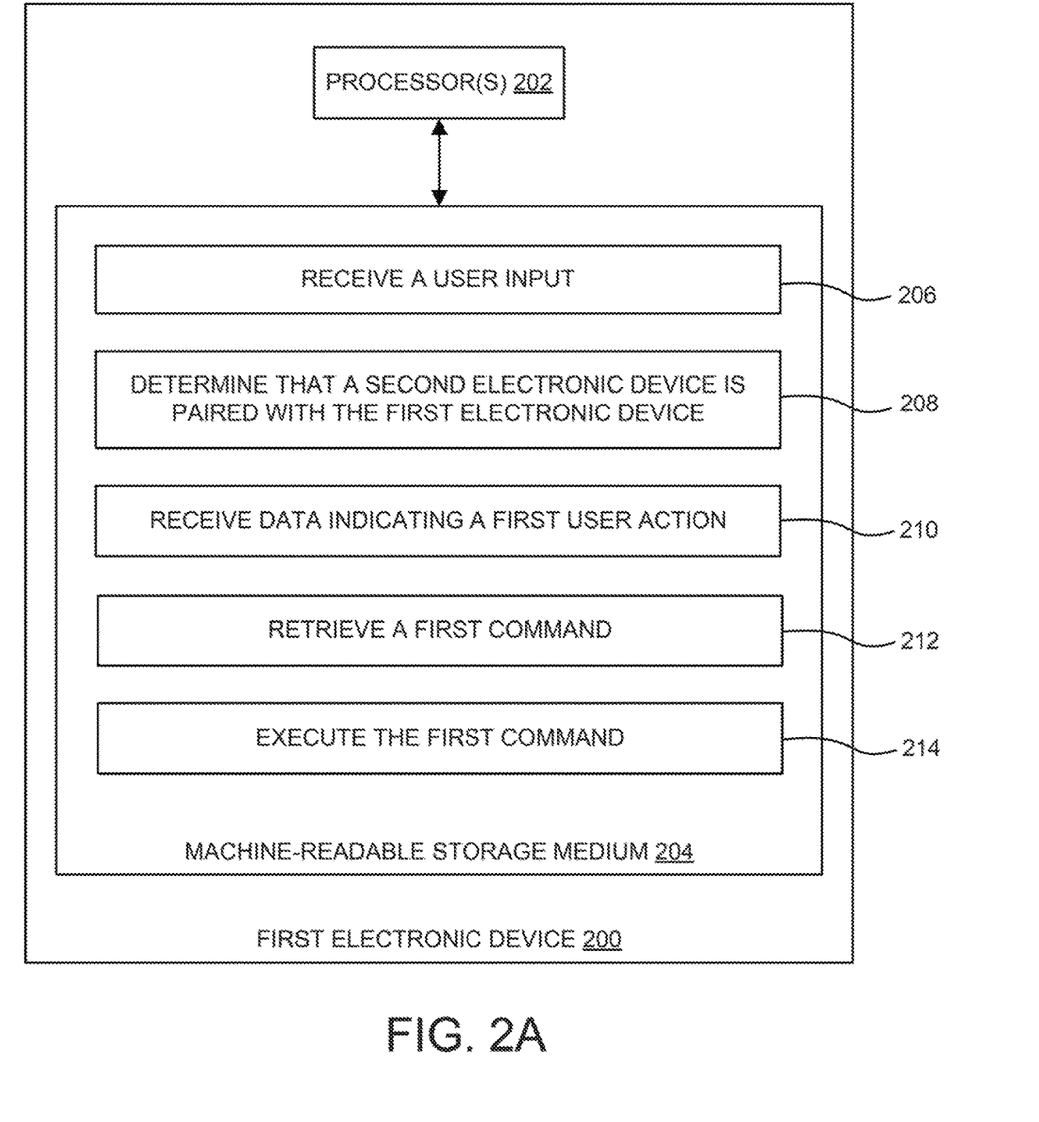
FIG. 2A is a block diagram of an example first electronic device including non-transitory machine-readable storage medium storing instructions to modify a status of an application running on the first electronic device.

FIG. 2A is a block diagram of an example first electronic device 200 including non-transitory machine-readable storage medium 204 storing instructions to modify a status of an application running on first electronic device 200. First electronic device 200 may include a processor 202 and machine-readable storage medium 204 communicatively coupled through a system bus. Processor 202 may be any type of central processing unit (CPU), microprocessor, or processing logic that interprets and executes machine-readable instructions stored in machine-readable storage medium 204.

Machine-readable storage medium 204 may be a random-access memory (RAM) or another type of dynamic storage device that may store information and machine-readable instructions that may be executed by processor 202. For example, machine-readable storage medium 204 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 204 may be non-transitory machine-readable medium. Machine-readable storage medium 204 may be remote but accessible to first electronic device 200.

As shown in FIG. 2A, machine-readable storage medium 204 may store instructions 206-214. In an example, instructions 206-214 may be executed by processor 202 to control an application running on first electronic device 200. Instructions 206 may be executed by processor 202 to receive a user input to generate mapping information. For example, the mapping information may map a first command and a second command to a first user action and a second user action, respectively.

Instructions 208 may be executed by processor 202 to determine that a second electronic device is paired with first electronic device 200 via a short-range wireless communication protocol. In an example, first electronic device 200 and the second electronic device may include a respective transceiver (i.e., a Bluetooth® transceiver) to support the pairing via the short-range wireless communication protocol. In an example, the short-range wireless communication protocol may include a Bluetooth® communication protocol. Even though examples in FIG. 2A is described using the Bluetooth® communication protocol, any other communication protocols that can establish pairing between first electronic device 200 and the second electronic device may be used.

Instructions 210 may be executed by processor 202 to receive, from the second electronic device, data indicating the first user action performed on an application running on the second electronic device in response to the determination. Instructions 212 may be executed by processor 202 to retrieve the first command mapped to the first user action based on the mapping information.

Instructions 214 may be executed by processor 202 to execute the first command to modify a status of an application running on first electronic device 200 from a first state to a second state. In one example, instructions to execute the first command to modify the status of the application may include instructions to execute the first command to modify a profile status associated with a communication application (e.g., a messaging and/or Voice over Internet Protocol (VoIP) service application) running on first electronic device 200 from a first status message (e.g., available) to a second status message (e.g., busy). Example profile status may indicate an availability of a user of first electronic device 200.

In another example, instructions to execute the first command to modify the status the application may include instructions to execute the first command to modify an operational status associated with a multimedia player application (e.g., a media player) running on first electronic device 200 from a first media state (e.g., play state) to a second media state (e.g., pause state). In this example, the operational status may indicate a state (e.g., play, pause, mute, or the like) of media content being played on the multimedia player application.

Figure 2B:
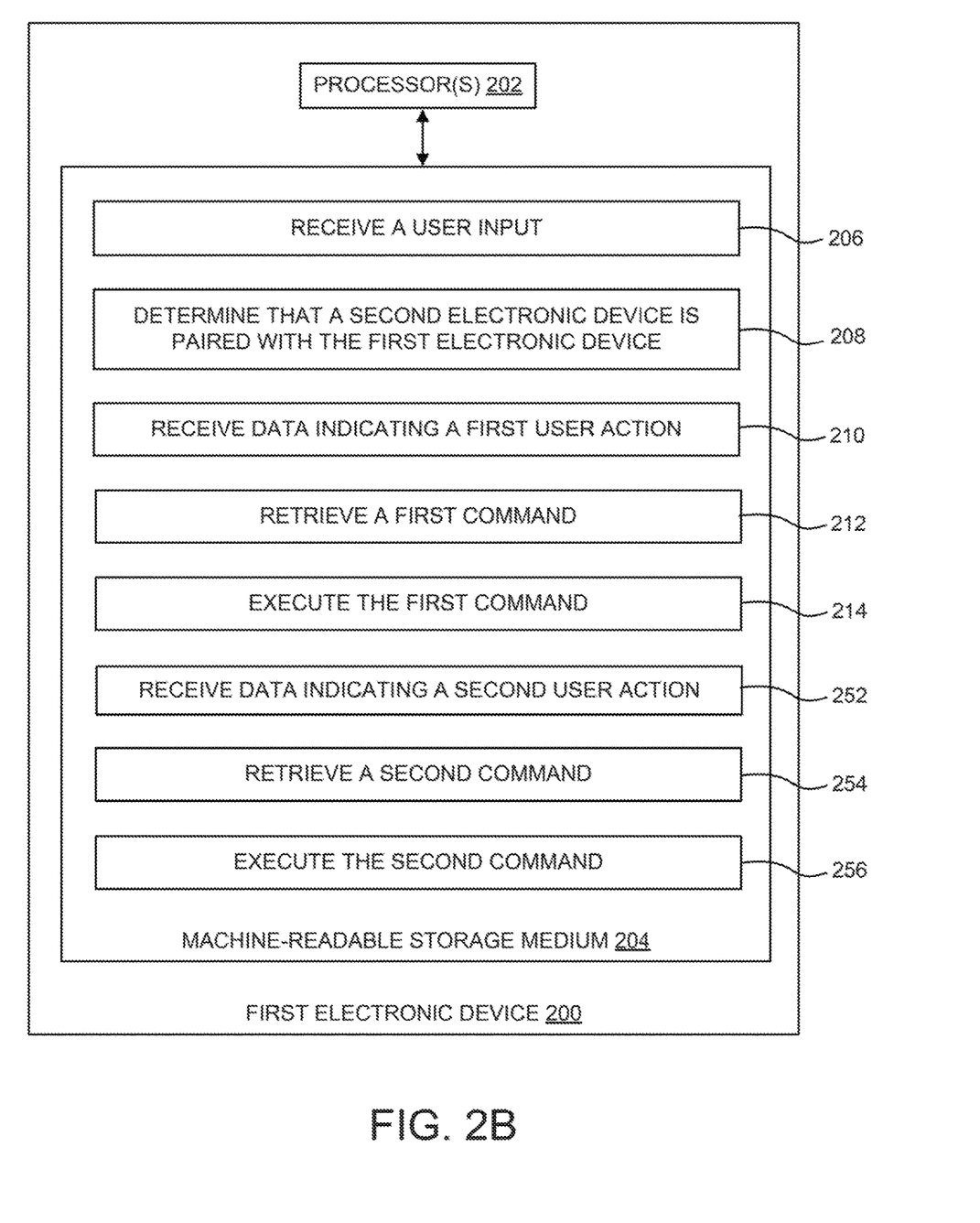
FIG. 2B is a block diagram of the example first electronic device of FIG. 2A, depicting additional instructions to modify the status of the application running on the first electronic device.

FIG. 2B is a block diagram of example first electronic device 200 of FIG. 2A, depicting additional instructions to modify the status of the application running on first electronic device 200. Similarly named elements of FIG. 2B may be similar in function and/or structure to elements described in FIG. 2A. As shown in FIG. 2B, instructions 252 may be executed by processor 202 to receive, from the second electronic device, data indicating the second user action performed on the application running on the second electronic device.

Instructions 254 may be executed by processor 202 to retrieve the second command mapped to the second user action based on the mapping information. Instructions 256 may be executed by processor 202 to execute the second command to modify the status of the application running on first electronic device 200 from the second state to the first state. Various example operations/commands that are mapped to different types of user actions may be explained in FIG. 2C.

Figure 2C:
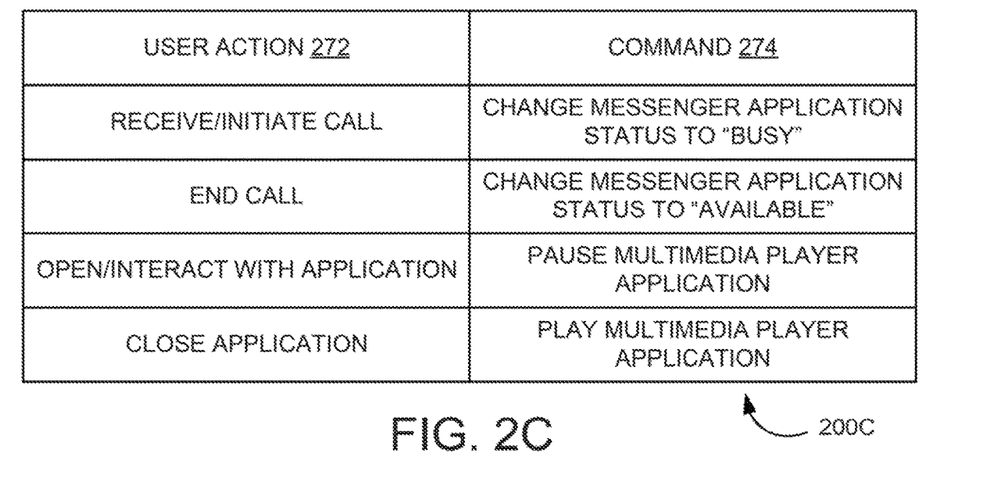
FIG. 2C illustrates an example table, depicting mapping information between user actions and commands.

FIG. 2C illustrates an example table 2000, depicting mapping information between user actions and commands. In one example, the mapping information may be user configurable. Table 2000 may include a list of user actions in a user action column 272 and a list of associated commands in a command column 274. As shown in FIG. 2C, table 200C may match the commands in command column 274 to associated user actions in user action column 272. Instructions (e.g., instructions 212 and 254 of FIGS. 2A and 2B, respectively) may access table 2000 to retrieve a command associated with a particular user action as indicated by the received data. Although FIG. 2C is described using table 200C, any suitable database format operable to be accessed and map associated commands and user actions may be used.

In the example table 2000, a first command "change messenger application status to busy" and a second command "change messenger application status to available" may be mapped to user actions "receive/initiate call" and "end call", respectively. In this example, when a user receives/initiates a call on the second electronic device, the first command may cause a profile status of an office messenger running in first electronic device 200 to be changed from "available" to "busy". Similarly, when the user ends/disconnects the call on the second electronic device, the second command may cause the profile status of the office messenger to be changed from "busy" to "available".

In another example shown in table 200C, a first command "pause multimedia player application" and a second command "play multimedia player application" may be mapped to user actions "open/interact with application" and "close application", respectively. In this example, when a user opens an application (e.g., a chat application) on the second electronic device, the first command may cause a media player running on first electronic device 200 to pause media content (e.g., video content). when the user closes the application (e.g., the chat application), the second command may cause the media player running on first electronic device 200 to play the media content. Thus, various applications running on first electronic device 200 can be controlled based on a type of user actions performed on the second electronic device.

Figure 3A:
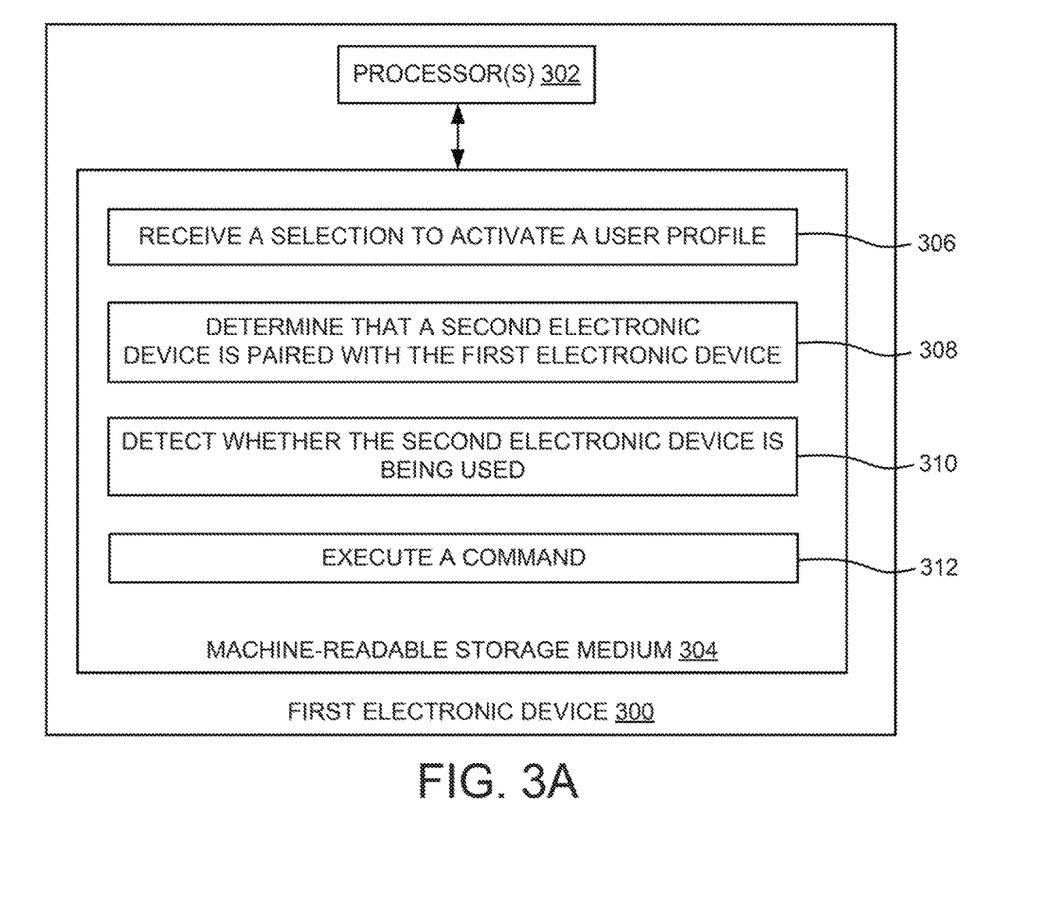
FIG. 3A is a block diagram of an example first electronic device including non-transitory machine-readable storage medium storing instructions to activate or deactivate a rule based on an occurrence of an event on a second electronic device.

FIG. 3A is a block diagram of an example first electronic device 300 including non-transitory machine-readable storage medium 304 storing instructions to activate or deactivate a rule based on an occurrence of an event on a second electronic device. First electronic device 300 may include a processor 302 and machine-readable storage medium 304 communicatively coupled through a system bus. Processor 302 may be any type of central processing unit (CPU), microprocessor, or processing logic that interprets and executes machine-readable instructions stored in machine-readable storage medium 304.

Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 304 may be non-transitory machine-readable medium. Machine-readable storage medium 304 may be remote but accessible to first electronic device 300.

As shown in FIG. 3A, machine-readable storage medium 304 may store instructions 306-312. In an example, instructions 306-312 may be executed by processor 302 to control an operational state of first electronic device 300 and/or an application running on first electronic device 300 in accordance with a selection of a user profile. Instructions 306 may be executed by processor 302 to receive a selection to activate a user profile. The user profile may define a rule to control an operational state of first electronic device 300, an application running on first electronic device 300, or a combination thereof.

Instructions 308 may be executed by processor 302 to determine that a second electronic device is paired with first electronic device 300 via a wireless connection in response to the activation of the user profile. Example wireless connection such as a short-range wireless connection may be used to establish communication between first electronic device 300 and the second electronic device. The second electronic device can be paired with first electronic device 300 via the short-range wireless connection. The short-range wireless connection may allow the first and second electronic devices to exchange information with each other. For example, the pairing of first electronic device 300 with the second electronic device may be performed using a Bluetooth® protocol, a ZigBee® protocol, a wireless local area network (LAN) protocol, an infrared data link, an inductive link, or any other pairing protocol.

In response to the determination, instructions 310 may be executed by processor 302 to detect whether the second electronic device is being used based on an occurrence of an event on the second electronic device. In one example, instructions to detect whether the second electronic device is being used may include instructions to detect whether the second electronic device is being used based on the occurrence of the event associated with an application running on the second electronic device. Example event may include opening/interacting with a chat application (e.g., an active chat window), initiating a call using a calling application, playing media content, or the like.

In another example, instructions to detect whether the second electronic device is being used may include instructions to:
receive, from the second electronic device, a signal indicating that the second electronic device is locked or unlocked,
detect that the second electronic device is being used when the signal indicates that the second electronic device is unlocked (e.g., a screen of the second electronic device is turned on), and
detect that the second electronic device is not being used when the signal indicates that the second electronic device is locked (e.g., a screen of the second electronic device is turned off).

Instructions 312 may be executed by processor 302 to execute a command to activate or deactivate the rule based on the detection. In an example, instructions to execute the command to activate or deactivate the rule may include instructions to:
execute a first command to activate the rule in response to the detection that the second electronic device is being used, and
execute a second command to deactivate the rule in response to the detection that the second electronic device is not being used.

In one example, the rule, upon activation, may switch the operational state of first electronic device 300 from a first operational state to a second operational state (e.g., a power saving mode) that consumes less power than the first operational state. In another example, the rule, upon activation, may lock first electronic device 300 to prevent an unauthorized access. In yet another example, the rule, upon activation, may control the application running on first electronic device 300. For example, controlling the application may include modifying a profile status of a user in a messenger application, playing/pausing media content of a media player application, or the like. Various example user profiles defining associated rules to control first electronic device 300 and/or an application running on first electronic device 300 may be explained in FIG. 3B.

Figure 3B:
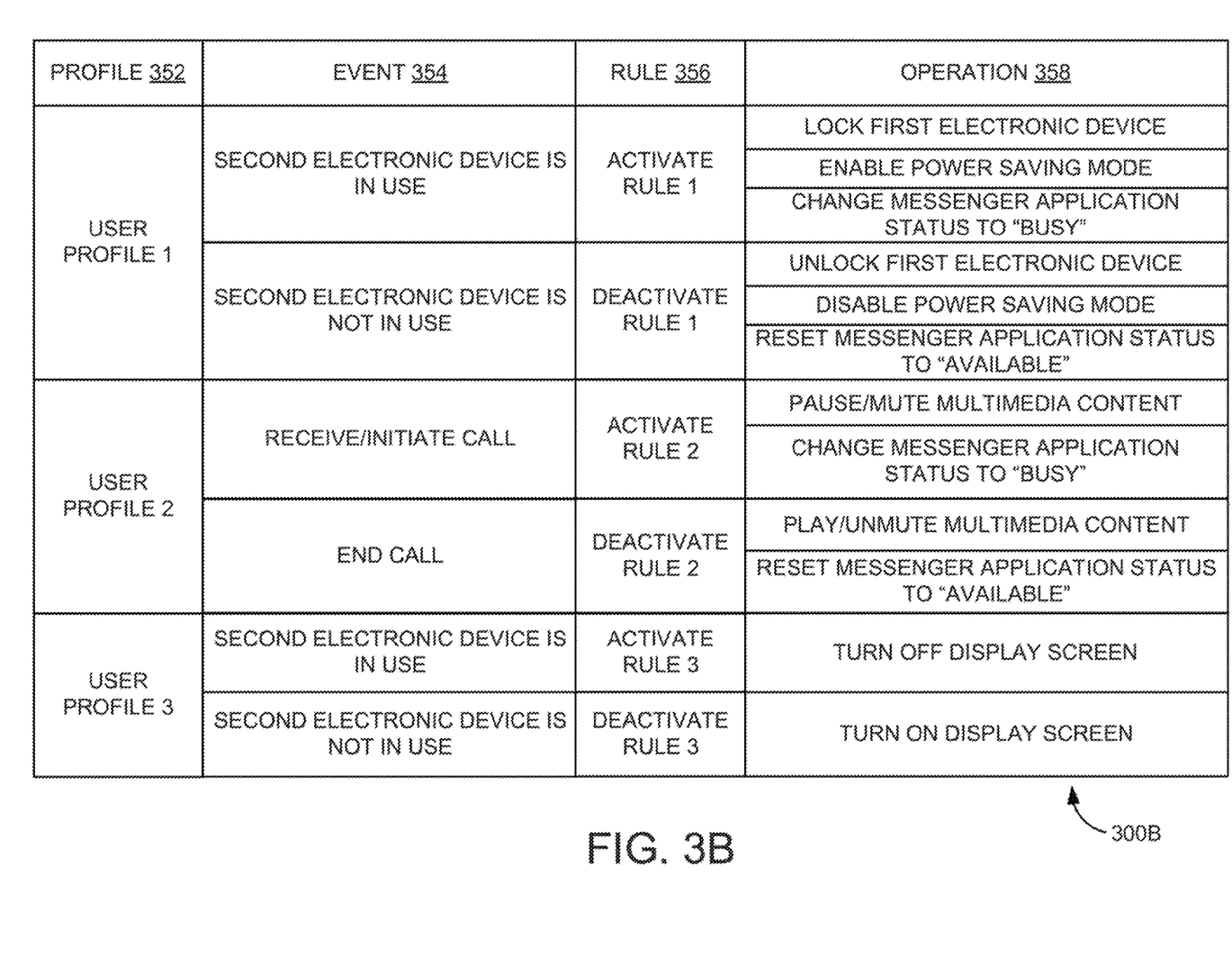
FIG. 3B illustrates an example table, depicting user profiles including associated rules to control an operational state of the first electronic device and/or an application running on the first electronic device.

FIG. 3B illustrates an example table 300B, depicting user profiles including associated rules to control an operational state of first electronic device 300 (e.g., as shown in FIG. 3A) and/or an application running on first electronic device 300. In one example, the user profiles may be user configurable. In an example, a user profile may be configured by generating a rule to perform an operation or a set of operations corresponding to an event. As shown in FIG. 3B, table 300B may include a list of user profiles in a profile column 352, a list of events in an event column 354, an activation/deactivation of a rule in a rule column 356, and a list of associated operations in an operation column 358.

Each user profile in profile column 352 may define a rule to perform an operation(s) to control an operational state of first electronic device 300 and/or an application running on first electronic device 300. For example, rule 1 associated with user profile 1 may be activated based on a selection of user profile 1 and an occurrence of an event on the second electronic device.

As shown in FIG. 3B, table 300B may depict user profiles in profile column 352 that match the operations in operation column 358 to associated events in event column 354. Instructions (e.g., instructions 312 FIG. 3A) may access table 300B to activate or deactivate a rule (e.g., rule 1, 2, or 3 in rule column 356) associated with a particular user profile based on an event as indicated by the received data. Although FIG. 3B is described using a table 300B, any suitable database format operable to be accessed and map associated operations and events may be used.

In the example table 300B, consider that a user activates user profile 1 in first electronic device 300. In this example, user profile 1 may include rule 1. Further, rule 1 may be activated in response to an occurrence of an event "second electronic device is in use". In this example, when the second electronic device is in use, rule 1 may be activated to perform operations such as locking first electronic device 300, enabling a power saving mode of first electronic device 300, and changing a status of a messenger application running on first electronic device 300 to "busy". Similarly, when the second electronic device is not in use, rule 1 may be deactivated.

In another example, consider that the user activates user profile 3. In this example, when the second electronic device is in use, rule 3 may be activated to turn off a display screen of first electronic device 300. Similarly, when the second electronic device is not in use, rule 3 may be deactivated. In yet another example, consider that the user activates user profile 2. In this example, when a call is received/initiated on the second electronic device, rule 2 may be activated to perform operations such as pause/mute multimedia content on first electronic device 300 and changing a status of a messenger application running on first electronic device 300 to "busy". Similarly, when the call is terminated, rule 2 may be deactivated. Thus, examples described herein may provide a configurable user profile (e.g., a set of rules) to decide a behavior of first electronic device 300 and associated applications based on an occurrence of events on the second electronic device.

In other examples, consider that the second electronic device is a printing apparatus. In this example, when the user initiates a copy job or a scan job on the printing apparatus, an associated rule can be activated or an associated command can be executed to control an operational state of first electronic device 300 and/or an application running on first electronic device 300. Similarly, when the copy job or the scan job is terminated, the rule can be reactivated. Thus, examples described herein can extend the rules to cover various scenarios where a user activity on one electronic device may call for an action on another electronic device.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A first electronic device comprising:
a memory to store a command that is mapped to an event;
a transceiver to pair a second electronic device with the first electronic device via a short-range wireless connection; and
a processor to:
receive data from the second electronic device via the transceiver, the data indicating an occurrence of the event on the second electronic device, wherein the event corresponds to a user interaction with a first application running on the second electronic device;
in response to receiving the data, retrieve the command that is mapped to the event from the memory; and
execute the command to control an operation of the first electronic device via a second application running on the first electronic device,
wherein the first application is of a different type than the second application.

2. The first electronic device of claim 1, wherein the processor is to execute the command to switch an operational state of the first electronic device from a first operational state to a second operational state that consumes less power than the first operational state.

3. The first electronic device of claim 1, wherein the processor is to execute the command to lock the first electronic device to prevent an unauthorized access.

4. The first electronic device of claim 1, wherein the event is occurred in response to a user interaction with the second electronic device.

5. The first electronic device of claim 1, wherein the short-range wireless connection is a Bluetooth connection, Near Field Communication (NFC) connection, Radio Frequency identification (RFID) connection, Infrared Data Association (IrDA) connection, Ultra-Wideband (UWB) connection, or a Zigbee connection.

6. The first electronic device of claim 1, wherein the first application is a chat application running on the second electronic device and the second application is a multimedia player running on the first electronic device.

7. A non-transitory machine-readable storage medium encoded with instructions that, when executed by a processor of a first electronic device, cause the processor to:
receive a user input to generate mapping information, wherein the mapping information is to map a first command and a second command to a first user action and a second user action, respectively;
determine that a second electronic device is paired with the first electronic device via a short-range wireless communication protocol;
receive, from the second electronic device, data indicating the first user action performed on a first application running on the second electronic device in response to the determination;
retrieve the first command mapped to the first user action based on the mapping information; and execute the first command to modify a status of a second application running on the first electronic device from a first state to a second state.

8. The non-transitory machine-readable storage medium of claim 7, further comprising instructions to:
receive, from the second electronic device, data indicating the second user action performed on the application running on the second electronic device;
retrieve the second command mapped to the second user action based on the mapping information; and
execute the second command to modify the status of the application running on the first electronic device from the second state to the first state.

9. The non-transitory machine-readable storage medium of claim 7, wherein instructions to execute the first command to modify the status of the application comprise instructions to:
execute the first command to modify a profile status associated with a communication application running on the first electronic device from a first status message to a second status message, wherein the profile status is to indicate an availability of a user of the first electronic device.

10. The non-transitory machine-readable storage medium of claim 7, wherein instructions to execute the first command to modify the status the application comprise instructions to:
execute the first command to modify an operational status associated with a multimedia player application running on the first electronic device from a first media state to a second media state, wherein the operational status is to indicate a state of media content being played on the multimedia player application.

11. The non-transitory machine-readable storage medium of claim 7, wherein the short-range wireless communication protocol comprises a Bluetooth communication protocol.

12. The non-transitory machine-readable storage medium of claim 7, wherein the first application is of a different type than the second application.

13. A non-transitory machine-readable storage medium encoded with instructions that, when executed by a processor of a first electronic device, cause the processor to:
receive a selection to activate a user profile, the user profile defining a rule to control an operational state of the first electronic device, an application running on the first electronic device, or a combination thereof;
determine that a second electronic device is paired with the first electronic device via a wireless connection in response to the activation of the user profile;
in response to the determination, detect whether the second electronic device is being used based on an occurrence of an event on the second electronic device; and
execute a command to activate or deactivate the rule based on the detection.

14. The non-transitory machine-readable storage medium of claim 13, wherein instructions to execute the command to activate or deactivate the rule comprise instructions to:
execute a first command to activate the rule in response to the detection that the second electronic device is being used; and
execute a second command to deactivate the rule in response to the detection that the second electronic device is not being used.

15. The non-transitory machine-readable storage medium of claim 13, wherein the rule, upon activation, is to:
switch the operational state of the first electronic device from a first operational state to a second operational state that consumes less power than the first operational state;
lock the first electronic device to prevent an unauthorized access; or
control the application running on the first electronic device.

16. The non-transitory machine-readable storage medium of claim 13, wherein instructions to detect whether the second electronic device is being used comprise instructions to:
detect whether the second electronic device is being used based on the occurrence of the event associated with an application running on the second electronic device.

17. The non-transitory machine-readable storage medium of claim 13, wherein instructions to detect whether the second electronic device is being used comprise instructions to:
receive, from the second electronic device, a signal indicating that the second electronic device is locked or unlocked;
detect that the second electronic device is being used when the signal indicates that the second electronic device is unlocked; and
detect that the second electronic device is not being used when the signal indicates that the second electronic device is locked.

18. The non-transitory machine-readable storage medium of claim 13, wherein the application is a first application, and wherein the event corresponds to a user interaction with a second application running on the second electronic device, and wherein the first application is of a different type than the second application.

* * * * *